US010354287B2

(12) United States Patent
Sim et al.

(10) Patent No.: US 10,354,287 B2
(45) Date of Patent: Jul. 16, 2019

(54) MONITORING CONVERSIONS AND FEE DETERMINATION OF ONLINE ADVERTISEMENTS USING A SOCIAL NETWORKING SYSTEM (71) Applicant: Facebook, Inc., Menlo Park, CA (US)

(72) Inventors: Richard Bill Sim, Foster City, CA (US); Jun Yang, Sunnyvale, CA (US); Mathew Varghese, Los Altos, CA (US); Eitan Shay, Palo Alto, CA (US); Feng Yan, Fremont, CA (US); Sadik Gokhan Coglar, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 441 days.

(21) Appl. No.: 13/909,312

(22) Filed: Jun. 4, 2013

(65) Prior Publication Data
US 2014/0358672 A1 Dec. 4, 2014

(51) Int. Cl.
G06Q 50/00 (2012.01)
G06Q 30/02 (2012.01)

(52) U.S. Cl.
CPC ..... G06Q 30/0273 (2013.01); G06Q 30/0246 (2013.01); G06Q 50/01 (2013.01)

(58) Field of Classification Search
USPC .......................................... 705/14.49, 14.46
See application file for complete search history.

(56) References Cited

U.S. PATENT DOCUMENTS

2008/0201214 A1* 8/2008 Aaron et al. ..................... 705/14
2008/0288328 A1* 11/2008 Minor ................ G06Q 10/0639
705/14.42
2010/0324990 A1 12/2010 D'Angelo et al.
2011/0137721 A1 6/2011 Bansal
2011/0264519 A1* 10/2011 Chan ...................... G06Q 30/02
705/14.49
2012/0089455 A1* 4/2012 Belani ................ G06Q 30/0245
705/14.44
2012/0166532 A1 6/2012 Juan et al.
(Continued)

OTHER PUBLICATIONS

Hua, M., et al., "Updating Features Based on User Actions in Online Systems," U.S. Appl. No. 13/690,254, filed Nov. 30, 2012.
(Continued)

Primary Examiner — David J Stoltenberg
Assistant Examiner — Gautam Ubale
(74) Attorney, Agent, or Firm — Fenwick & West LLP (57) ABSTRACT When the social networking system selects an advertisement for presentation to the user by a client device, a content identifier associated with the selected advertisement is stored in an advertisement history associated with the user. When the user performs a conversion event associated with the selected advertisement, the social networking system receives a content identifier and a user identifier from a client device used that performed the conversion event and retrieves the user's advertisement history. If the retrieved advertisement history includes a content identifier for the selected advertisement matching the content identifier received from the client device and a time between the conversion event and providing the selected advertisement to the client device is less than a threshold time period, a fee is determined for presentation of the selected advertisement.

22 Claims, 4 Drawing Sheets (56) References Cited

U.S. PATENT DOCUMENTS

2012/0278158 A1 11/2012 Farahat

OTHER PUBLICATIONS

Kabiljo, I., et al., "Customized Predictors for User Actions in an Online System," U.S. Appl. No. 13/689,969, filed Nov. 30, 2012.
Shalita, A. M., et al., "Dynamic Expressions for Representing Features in an Online System," U.S. Appl. No. 13/690,088, filed Nov. 30, 2012.
Mathur, N., et al., "Targeted Advertisements in Mobile Applications," U.S. Appl. No. 13/689,160, filed Nov. 30, 2012.
United States Patent and Trademark Office, Before the Patent Trial and Appeal Board, Decision on Appeal, U.S. Appl. No. 13/909,315, Appeal No. 2017-000882, May 22, 2018, seventeen pages.

* cited by examiner

MONITORING CONVERSIONS AND FEE DETERMINATION OF ONLINE ADVERTISEMENTS USING A SOCIAL NETWORKING SYSTEM

BACKGROUND

This invention relates to advertising, and in particular to monitoring conversion of advertisements and determining fees charged to advertisers.

Online advertising has become an increasingly profitable business that allows entities to present advertisements to users viewing websites or accessing content through native applications. Entities that advertise online and online systems presenting advertisements have an interest in tracking conversion events resulting from presentation of an online advertisement to determine the effectiveness of online advertisements. However, users often are associated with multiple devices (e.g., mobile phone, tablet, laptop computer, etc.), so a device that presents an advertisement to the user may differ from the device used by the user to perform the conversion event, complicating tracking of conversion events.

Additionally, some percentage of users will typically perform a conversion event associated with an online advertisement regardless of whether they were presented with the advertisement. This may artificially inflate the perceived effectiveness of the advertisement. Additionally, this artificial inflation of an advertisement's effectiveness results in the advertiser overpaying to present the advertisement.

SUMMARY

A social networking system monitors onsite and offsite conversion events and determines fees to charge advertisers based on the monitored conversion events. As used herein, an "onsite conversion event" occurs if an advertisement is presented to a user on a client device and the user performs a conversion event using the client device that presented the advertisement. An "offsite conversion event" occurs if an advertisement is presented to the user on a client device, and the user subsequently performs a conversion event using a different client device.

The social networking system selects an advertisement for presentation to a user via a client device. For example, the social networking system selects the advertisement from one or more stored candidate ad requests that each include an advertisement, and may also include a bid amount, targeting criteria, or other information associated with the advertisement. The social networking system may select the advertisement for presentation using any suitable method. For example, the social networking system uses an auction process based on bid amounts associated with ad request, targeting criteria associated with ad requests, a combination of bid amounts and targeting criteria associated with ad requests, or any other suitable information to select an advertisement.

The social networking system provides the selected advertisement to a client device for presentation to the user and stores a content identifier (ID) associated with the selected advertisement in an advertisement ("ad") history associated with the user. The ad history identifies advertisements presented to the user. The social networking system may maintain an ad history for various users to maintain a record of advertisements presented to various users. For example, an ad history is associated with a user identifier of a user of a social networking system to identify advertisements previously presented to the user by the social networking system.

After presentation of the selected advertisement to the user by the client device, the user may perform a conversion event associated with the selected advertisement. A conversion event, or "conversion" occurs when a user accessing content performs an action associated with the selected advertisement, such as an action associated with the selected advertisement by an advertiser or other entity. The conversion event may be performed using the client device that presented the advertisement or using an additional client device. Additionally, the conversion event may occur long after the selected advertisement was presented to the user.

When the user performs the conversion event, the client device used to perform the conversion requests advertisement ("ad") conversion content. The ad conversion content may be requested from a third party system. For example, the ad conversion content is content presented to the user performing the conversion event or other information indicating to the user that a conversion has occurred. When a request for ad conversion content is received, a third party system, or other system, sends the ad conversion content to the client device that performed the conversion along with instructions that cause the client device that performed the conversion to retrieve locally stored user identification ("ID") information for the user associated with the social networking system, and to send the user ID information and a content ID associated with the conversion event to the social networking system. For example, when the client device that performed the conversion event renders ad conversion content, the client device executes the instructions and sends user ID information and the content ID to the social networking system.

The social networking system retrieves the ad history associated with the received user ID information and determines a fee for presentation of the selected advertisement to the user based on the content ID associated with the conversion event and the retrieved ad history. For example, the social networking system determines if the received content ID matches a content ID stored in the retrieved ad history. If the received content ID does not match a content ID included in the retrieved ad history, no fee is accessed. However, if the received content ID matches a content ID stored in the retrieved ad history, the social networking system determines if a time between the conversion event and providing the selected ad to the client device is less than a threshold time period. If the time is less than the threshold time period, the social networking system charges a fee to an advertiser associated with the selected advertisement and does not charge the advertiser if the time is not less than the threshold time period.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
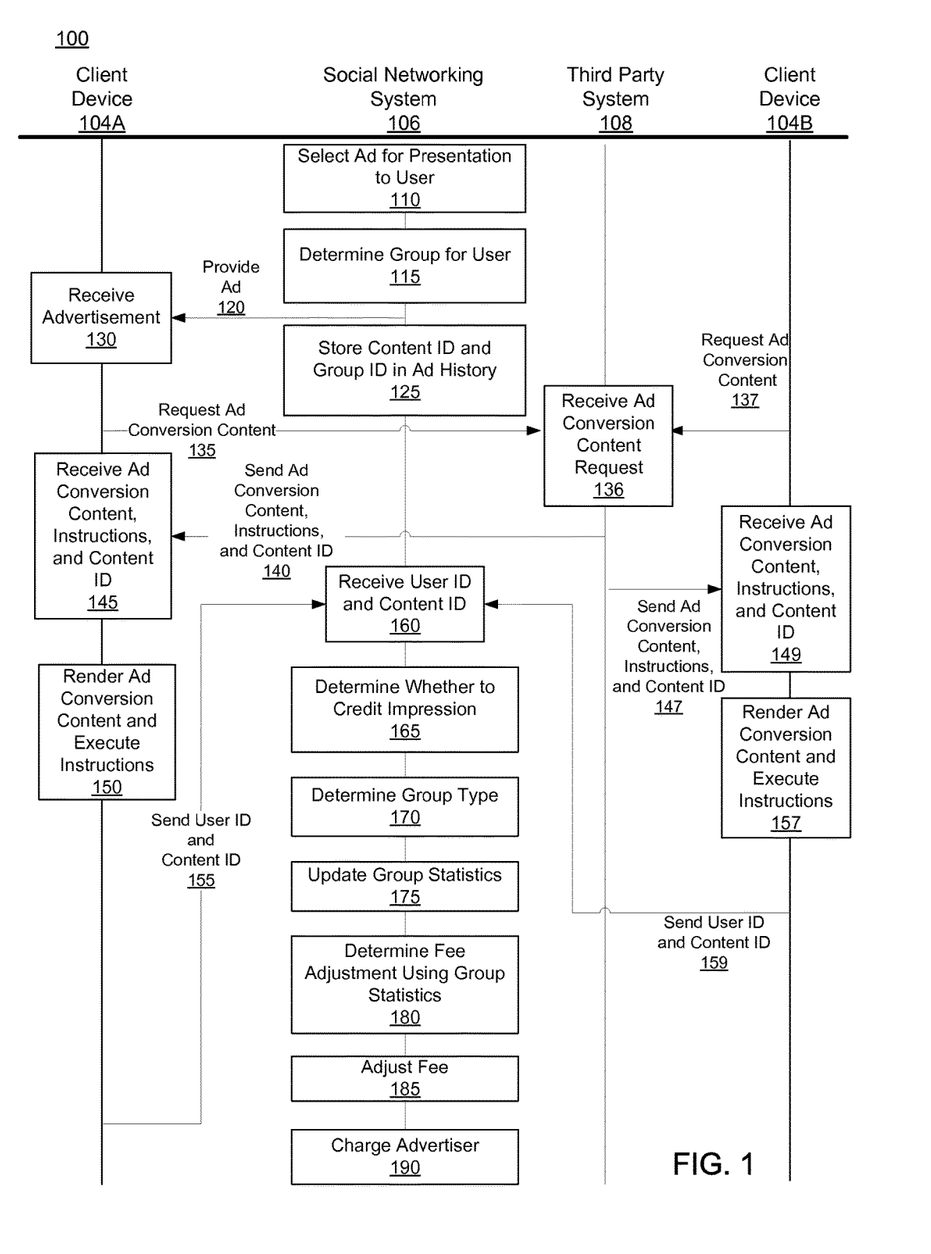
FIG. 1 is an interaction diagram of a process for monitoring conversion events and determining fees to charge advertisers for conversion events, in accordance with an embodiment of the invention.

FIG. 1 is an interaction diagram of one embodiment of a process 100 for monitoring conversion events and determining fees to charge advertisers for conversion events. A conversion event, or "conversion," occurs when a user accessing content performs an action associated with an advertisement. The action may be associated with an advertisement by an advertiser or other entity, so that different events are conversion events for different advertisements. Examples of actions that may be conversion events include: making a purchase, filling in and submitting a form (e.g., event registration), signing up for a newsletter or RSS feed, completing a goal for a website, etc. As used herein, an "onsite conversion event" occurs if an advertisement is presented to a user on a client device and the user performs a conversion event using the client device that presented the advertisement. Additionally, an "offsite conversion event" occurs if an advertisement is presented to the user on a client device, and the user subsequently performs a conversion event using a different client device.

In the example of FIG. 1, a social networking system 106 stores one or more advertisement ("ad") requests that each include an advertisement and a bid amount. An advertisement generally includes any communication intended to cause the recipient of the communication to take some action concerning a product or service. For example, an advertisement includes an offer for a deal or provides information describing a product or service. Ad requests may also include targeting criteria specifying characteristics of social networking system users eligible to be presented with an advertisement included in an ad request. However, stored ad requests may not include targeting criteria. In one embodiment, if an ad request does not include targeting criteria, the social networking system 106 may analyze the content of the ad request to infer targeting criteria. For example, the social networking system 106 applies a fuzzy matching algorithm using the types of interactions performed by users, user characteristics, and/or types of connections between users in the group as characteristics to content of an ad request to infer targeting criteria for the ad request.

The ad requests may be provided by one or more third party systems 108 or by any other suitable entity. In some embodiments, a third party system 108 provides an ad request directly to the social networking system 106. Alternatively, the third party system 108 may indirectly provide the ad request to social networking system 106 using an ad network or an ad exchange. Additionally, the social networking system 106 may also generate ad requests. An advertisement request generally includes advertisement content and a bid amount.

The social networking system 106 selects 110 an advertisement for presentation to a user from stored ad requests. For example, the social networking system 106 identifies candidate ad requests from an advertisement store and selects 110 an advertisement from a candidate ad request.

The social networking system 106 may select 110 the advertisement for presentation using any suitable method. For example, the social networking system 106 uses an auction process based on bid amounts associated with ad request, targeting criteria associated with ad requests, a combination of bid amounts and targeting criteria associated with ad requests, or any other suitable information to select 110 the advertisement. In one embodiment, the social networking system 106 selects 110 an advertisement associated with an ad request having a highest expected value determined from the bid amounts. For example, an internal auction, an external auction, or both types of auctions may be used by the social networking system 106 to select 110 the advertisement. As another example, the social networking system 106 compares targeting criteria of various candidate ad requests to information about the user maintained by the social networking system 160 and ranks the ad requests based on matches between targeting criteria and information about the user. The advertisement may then be selected 110 based on the ranking. This ranking of ad requests may also account for the expected value of presenting the advertisements based on the bid amount of various ad requests and the likelihood of the user accessing the advertisements included in various ad requests. An example process for selecting and providing targeted advertisements to social networking system users is disclosed in U.S. patent application Ser. No. 12/853,242, filed on Aug. 9, 2012, which is hereby incorporated by reference in its entirety.

The social networking system 106 determines 115 a group associated with the user based on the selected advertisement. For example, social networking system users are associated with a holdout group or a target group for the selected advertisement based on a polling algorithm that determines a number of users selected to receive an advertisement that are not presented with the advertisement. Users included in the holdout group of an advertisement are not presented with the advertisement and may receive alternative content such as an alternative advertisement or other information. However, users in the target group of an advertisement are presented with the advertisement when it is selected 110. The polling algorithm may be modified to adjust the percentage of users associated to the holdout group and associated with the target group for various advertisements. Additionally, different polling algorithms may be used for different advertisements.

In one embodiment, the social networking system 106 associates a group identifier ("ID") with a user to indicate if the user is in a holdout group or a target group for the selected advertisement. The group ID identifies the user as associated with a group for a particular advertisement. Accordingly, a user may have multiple group IDs associated with different advertisements and may be associated with different groups for different advertisements. For example, a user may be a member of a holdout group for one advertisement and a member of the target group for a different advertisement.

If the user is not associated with the holdout group for the selected advertisement (e.g., the user is included in the target group for the selected advertisement), the social networking system 106 provides 120 the selected advertisement to a client device 104A associated with the user. However, if the user is associated with the holdout group for the selected advertisement, the social networking system 106 does not provide 120 the selected advertisement to the client device 104A. Instead, the social networking system 106 provides alternative content, such as a placeholder or a placebo advertisement (i.e., an advertisement different from the selected advertisement), to the client device 104A. A placeholder is a content item occupying a display space where the selected advertisement would have been presented, but includes content unrelated to the selected advertisement. In alternate embodiments, if the user is associated with the holdout group for the selected advertisement, the social networking system 106 does not provide content to the client device 104A for presentation to the user.

The social networking system 106 stores 125 a content identifier ("ID") associated with the selected advertisement, or alternative content, provided to the client device 104A in an advertisement ("ad") history for the user. The ad history identifies information about advertisements or other content presented to the user and is associated with the user's user profile. For example, the ad history includes content IDs for advertisements or other content provided to client devices, a time stamp associated with each advertisement or other content item provided to the client devices, a type associated with various advertisements or content items presented to the user (e.g., selected, placebo, placeholder, or none), or some combination thereof. The time stamp may indicate when an advertisement was sent to the client device 104A or when the corresponding content ID was stored in the ad history.

The client device 104A receives 130 the selected advertisement or alternative content form the social networking system based on whether the user is associated with the holdout group for the selected advertisement and presents the received content to the user. After presentation of the content, such as the selected advertisement or alternative content, the user performs a conversion event associated with the selected advertisement via the client device 104A or another client device 104B. The conversion may be performed long after the selected advertisement was presented to the user or may be performed if the user was not presented with the selected advertisement. In one embodiment where the user was presented with the selected advertisement, the conversion event occurs when the user accesses the selected advertisement presented by the client device 104A, causing the client device 104A to access a website associated with the selected advertisement. However, the user may also instruct the client device to access the website associated with the selected advertisement without accessing the selected advertisement. For example, the user enters a uniform resource locator (URL) associated with the website into a browser running on the client device 104A, which is also a conversion event.

In one embodiment, the website associated with the selected advertisement is maintained by a third party system 108. However, in other embodiments the website is hosted by another system that refers the client device to the third party system 108 when the website is requested by the client device 104A. While a "website" is used herein, any other suitable content may be associated with the advertisement and accessing the content is a conversion event. In the example of FIG. 1, when the user performs a conversion event using the client device 104A, advertisement ("ad") conversion content is requested 135 from the third party system 108 by the client device 104A. The ad conversion content includes information indicating to the user that the conversion has occurred. For example, the ad conversion content is information from a website or other system associated with the selected advertisement. When the request for ad conversion content is received 135, the third party system 108 sends 140 the ad conversion content as well as instructions and a content ID associated with the subject matter of the conversion to the user device 104A. The instructions are program code, that when executed, cause the client device that performed the conversion event to retrieve user ID information stored on the client device and used by the social networking system 106 to identify the user and the content ID associated with the subject matter of the conversion. Execution of the instructions also causes the client device from which the conversion was performed to send 155 the retrieved user ID information and the content ID to the social networking system 106. The instructions may be JAVASCRIPT® or another suitable form of executable instructions.

User ID information stored on a client device used to perform a conversion event includes a user identifier uniquely associating the user with a user profile maintained by the social networking system 106. In one embodiment, user ID information is associated with a social networking application executing on the client device (e.g., client device 104A, 104B) that requested the ad conversion content. The user ID information may be stored in a shared memory location of the client device 104A or 104B, allowing an application other that the social networking application to access the user ID information. In other embodiments, the user ID information is a cookie received from the social networking system 106 and stored by the client device 104A, 104B. For example, the client device 104A, 104B receives the cookie from the social networking system 106 when the user first accesses the social networking system 106 using the client device 104A, 104B.

In some embodiments, if the client device executing the instructions includes user ID information associated with multiple users, the client device selects the user ID information associated with a user who most recently accessed the social networking system 106 for sending 155 (or 159) to the social networking system 106. In some embodiments, the client device executing the instructions selects the user ID information associated with the user who most recently accessed the selected advertisement for sending 155 (or 159) to the social networking system 106. Alternatively, the client device executing the instructions may send 155 (or 159) stored user ID information associated with multiple users to the social networking system 106.

When a conversion event is performed using the client device 104A on which the selected advertisement was presented (an "onsite conversion event"), the client device 104A requests 135 ad conversion content and receives 145 the ad conversion content, instructions, and the content ID. The client device 104A renders 150 the received ad conversion content. As the client device 104A renders 150 the ad conversion content, the instructions are executed, causing the client device 104A to retrieve the user ID information, and to send 155 the retrieved user ID information and the content ID to the social networking system 106. Additionally, in some embodiments, the executed instructions may cause the client device 104A to send a conversion value, currency information, some other suitable information, or some combination thereof.

When a conversion event is performed using an additional client device 104B other than the client device 104A on which the selected advertisement was presented (an "offsite conversion event"), the additional client device 104B requests 137 ad conversion content from the third party system 108. Ad conversion content is provided 147 from the third party system 108 to the additional client device 104B along with instructions and a content ID associated with the subject matter of the conversion event. When the ad conversion content, the instructions, and the content ID are received, the additional client device 104B renders 157 the ad conversion content and executes the instructions. Execution of the instruction causes the additional client device 104B to retrieve locally-stored user ID information associated with the user and to send 159 the retrieved user ID information and the content ID to the social networking system 106. Additionally, in some embodiments, the executed instructions may cause the additional client device 104B to send a conversion value, currency information, some other information relevant to the conversion event, or some combination thereof.

Hence, when a conversion event occurs using a client device 104A that presented the selected advertisement or on an additional client device 104B, the social networking system 106 receives 160 the user ID information and the content ID from the client device 104A, 104B. Based on the received content ID and user ID information, the social networking system 106 determines 165 whether to credit the conversion event to presentation of the selected advertisement. In the context of online advertisement, presentation of the selected advertisement is an "impression," regardless of whether the selected advertisement is accessed. Hence, each time an advertisement is presented to the user is an "impression" of the advertisement.

To determine 165 whether a conversion event is credited to an impression of the selected advertisement, the social networking system 106 retrieves an ad history for a user associated with the user ID information received from the client device 104A, 104B used to perform a conversion event. The social networking system 106 compares the content ID received from the client device 104A or 104B on which the conversion event was performed with content IDs stored in the retrieved ad history. If the received content ID from the client device 104A, 104B on which the conversion event does not match a content ID associated with the selected advertisement in the retrieved ad history, the impression of the selected advertisement, the conversion event is note credited to the impression of the selected advertisement.

However, if the received content ID matches a content ID associated with the selected advertisement in the ad history, the social networking system 106 may determine 165 whether to credit the conversion event to an impression based on timing of the conversion event and the impression. For example, the conversion event is credited to the impression of the selected advertisement if a time between the conversion event and providing the selected advertisement to the client device 104A is less than a threshold time period. If the time between the conversion event and providing the selected advertisement to the client device 104A is greater than the threshold time period, the conversion event is not credited to the impression of the selected time period. The threshold time period may be set to any time period. For example, the threshold time period may be 30 days. In other embodiments, different and/or additional information associated with the impression and the conversion event may be used to determine 165 whether to credit the conversion event to the impression. Accordingly, the social networking system 106 may determine 160 whether to credit impressions of the selected advertisement to a user for onsite or offsite conversion events.

After receiving the content ID and the user ID information from a client device 104A, 104B on which the conversion event occurred, the social networking system 106 determines 170 a group type associated with the user. For example, the social networking system 106 retrieves information describing user identifiers associated with a holdout group for the selected advertisement to determine 170 whether the user is associated with the holdout group for the selected advertisement. Based on whether the conversion event was credited to the impression of the selected advertisement, the social networking system determines initial fee assessed to an advertiser for presentation of the selected advertisement. If the user is associated with the holdout group, the advertiser is not assessed a fee for the conversion event associated with the selected advertisement, as the user was not presented with the selected advertisement. In contrast, if the user is associated with the target group (i.e., the user was not associated with the holdout group) and the social networking system 106 credited the conversion event to presentation of the selected advertisement, the social networking system 106 determines an initial fee to charge the advertiser. The initial fee may be based on the bid amounts of the ad requests used when selecting 110 the advertisement. For example, the initial fee is the bid amount associated with the ad request including the selected advertisement or is the bid amount associated with another ad request incremented by an amount.

Based on the conversion event, the social networking system 105 updates 175 group statistics for the selected advertisement. Group statistics may be maintained for the target group and/or holdout group associated with the selected advertisement. For example, group statistics include one or more of: user ID information for users associated with the target group, user ID information for users associated with the holdout group, group IDs, content IDs, types of advertisements or other content provided to a client device (e.g., selected, placebo, placeholder, or none), type of conversion event, time between impression and conversion event, an identifier for the client device presenting the selected advertisement, an identifier for the client device used for the conversion event, currency information, a conversion value, or any other suitable information. For example, if a conversion event performed by a user associated with a target group for the selected advertisement is credited to an impression of the selected advertisement, group statistics for the target group are updated 175 to identify the user's user ID information, the time of the impression, the time of the conversion event, and identifier of the client device that presented the selected advertisement, and an identifier of the client device on which the conversion event occurred. In some embodiments, the social networking system 106 may analyze portions of the group statistics to determine pricing information for advertisements and may modify selection of an advertisement to determine expected values for ad requests based on likelihood of conversion events.

In some embodiments, the social networking system 106 may adjust the threshold time period used in determining whether to credit the conversion event to an impression, based on the group statistics. For example, analysis of the group statistics may indicate that a 7 day threshold time period is more effective than a 30 day threshold time period for a particular application. In some embodiment, the threshold time period is determined by analyzing portions of the group statistics over a particular length of time (timing window). Moreover, in some embodiments, the length of the timing window is not tied to a single time period, and may be set to any time period. For example, the social networking system 106 (or by an administrator) may set a particular window for certain reasons (e.g., statistical, accounting, business, etc.) for some types of conversions (e.g., 5 days for application installations), and a different window for other types of conversions (e.g., 90 days for car-buying).

In one embodiment, group statistics for the holdout group and target group associated with a selected advertisement are used by the social networking system 106 to determine 180 a fee adjustment to the initial fee for presentation of the selected advertisement. For example, the social networking system 106 determines a holdout conversion rate based on a number of conversion events associated with users associated with the holdout group for the selected advertisement. Similarly, the social networking system 106 determines a target conversion rate based on a number of conversion events associated with users associated with the target group for the selected advertisement. For example, the group statistics for groups associated with the selected advertisement indicate that the holdout group associated with the selected advertisement includes 10% of the total social networking system users, and that 20% of the users in the target group and 10% of the users in the holdout group perform a conversion event associated the selected advertisement. In this example, the holdout conversion rate is 10% and the target conversion rate is 20%.

Using the target conversion rate and the holdout conversion rate, the social networking system 106 determines 180 an adjustment value modifying the initial fee for presentation of the selected advertisement. In one embodiment, the adjustment value is the difference between the target conversion rate and the holdout conversion rate. In the preceding example, the adjustment value would be 10% (i.e., 20%−10%=10%). Thus, the adjustment value reflects an increase in the number of conversion events due to one or more impressions of the selected advertisement.

The social networking system 106 adjusts 185 the initial fee based on the adjustment value. In one embodiment, the social networking system 106 multiplies the initial fee by a discount factor based on the adjustment value. For example, if the adjustment value is the difference in target conversion rate and holdout conversion rate, the initial fee is multiplied by one minus the adjustment value to determine an adjusted fee. As another example, the initial fee may be reduced by a set percentage if the adjustment value is within a particular range. For example, if the adjustment value falls between 10-20% the initial fee may be reduced by 5%, if the adjustment value falls between 21-30% the initial fee may be reduced by 20%, etc. The social networking system 106 then charges 190 the advertiser the adjusted fee. Accordingly, the social networking system 106 charges advertisers a more accurate fee for presentation of the selected advertisement by accounting for conversions of the selected advertisement that are not caused by a corresponding impression and modifying the fee charged accordingly. In some embodiments, the social networking system 106 may also update group statistics with the adjustment value, the adjusted fee, or both. Thus, although the social networking system 106 tracks impressions of the selected advertisement, the fee charged to the advertiser associated with the selected advertisement is based on the number of conversion events (i.e., charge per conversion or charge per acquisition).

In some embodiments, the social networking system 106 extracts conversion data from the group statistics and reports the conversion data to advertisers. As noted above, the group statistics may include information about the number of conversions credited to impressions of an advertisement and not credited to impressions of an advertisement for users of the social networking system 106, groups associated with those users, and adjustment values and adjusted fees associated with the users. Based on the group statistics, the social networking system 106 may identify conversion events occurring without presentation of an advertisement, providing information about non-sponsored, or organic, information about the subject matter of an advertisement. For example, the number of conversion events performed by members of the holdout group for an advertisement provides information about organic distribution of content relating to the selected advertisement.

System Architecture

Figure 2:
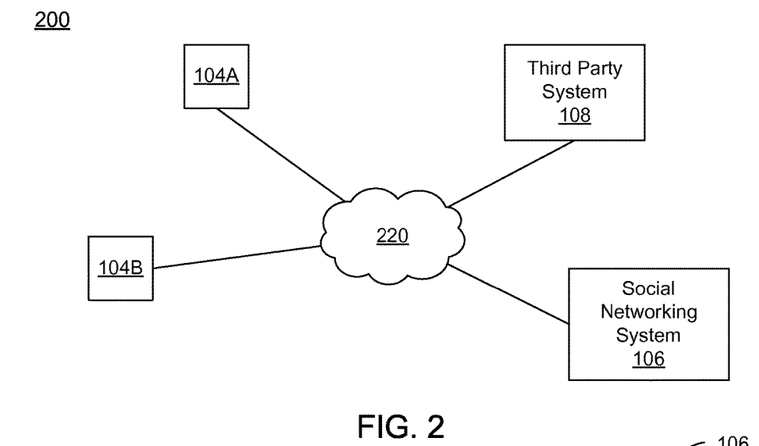
FIG. 2 is a block diagram of a system environment in which a social networking system operates, in accordance with an embodiment of the invention.

FIG. 2 is a block diagram of a system environment 200 for a social networking system 106. The system environment 200 shown by FIG. 2 comprises one or more client devices 104A, 104B, a network 220, one or more third-party systems 108, and the social networking system 106. In alternative configurations, different and/or additional components may be included in the system environment 200. The embodiments described herein can be adapted to online systems that are not social networking systems.

The client devices 104A, 104B are one or more computing devices capable of receiving user input as well as transmitting and/or receiving data via the network 220. In one embodiment, one or more client devices 104A, 104B are a conventional computer system, such as a desktop or a laptop computer. Alternatively, one or more client devices 104A, 104B may be a device having computer functionality, such as a personal digital assistant (PDA), a mobile telephone, a smartphone or another suitable device. One or more client devices 104A, 104B are configured to communicate via the network 220. In one embodiment, one or more client devices 104A, 104B execute an application allowing a user of the client devices 104A, 104B to interact with the social networking system 106. For example, a client device 104A executes a browser application to enable interaction between the client device 104A and the social networking system 106 via the network 220. In another embodiment, one or more client devices 104A, 104B interact with the social networking system 106 through an application programming interface (API) running on a native operating system of the one or more client devices 104A, 104B, such as IOS® or ANDROID™.

The client devices 104A, 104B are configured to communicate via the network 220, which may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 220 may be represented using any suitable format, such as hypertext markup language (HTML) or extensible markup language (XML). In some embodiments, all or some of the communication links of the network 220 may be encrypted using any suitable technique or techniques.

One or more third party systems 108 may be coupled to the network 220 for communicating with the social networking system 106, which is further described below in conjunction with FIGS. 3-4B. In one embodiment, a third party system 108 is an application provider communicating information describing applications for execution by one or more client devices 104A, 104B or communicating data to client devices 104A, 104B for use by an application executing on the client device. In other embodiments, a third party system 108 provides content or other information for presentation via one or more client devices 104A, 104B. A third party system 108 may also communicate information to the social networking system 106, such as ad requests, content, or information about an application provided by the third party system 108.

Figure 3:
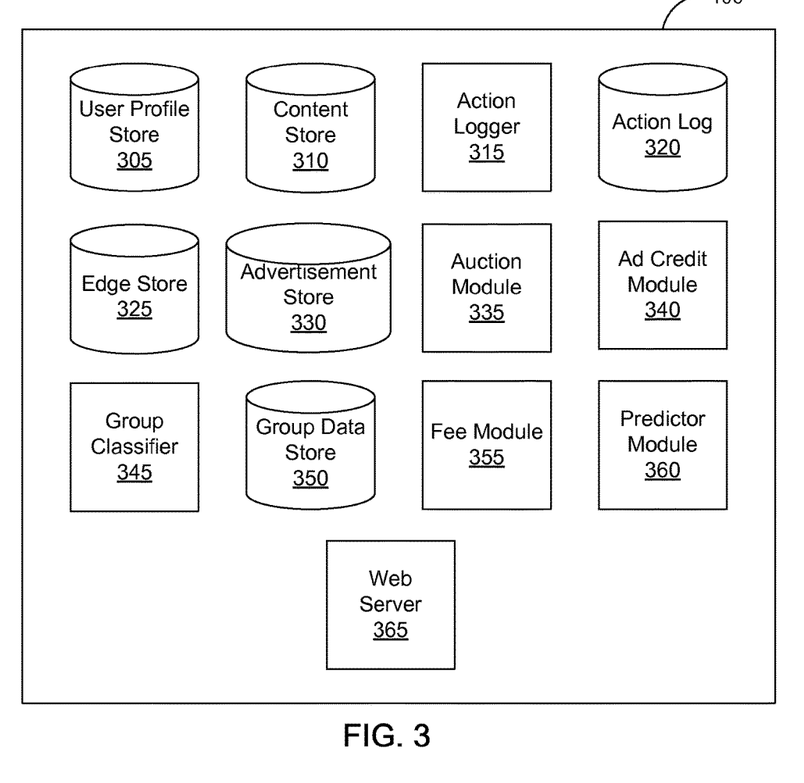
FIG. 3 is a block diagram of a social networking system, in accordance with an embodiment of the invention.

FIG. 3 is an example block diagram of an architecture of the social networking system 106. The social networking system 106 shown in FIG. 3 includes a user profile store 305, a content store 310, an action logger 315, an action log 320, an edge store 325, an advertisement store 330, an auction module 335, an ad credit module 340, a group classifier 345, a group data store 350, a fee module 355, a predictor module 360, and a web server 365. In other embodiments, the social networking system 106 may include additional, fewer, or different components for various applications. Conventional components such as network interfaces, security functions, load balancers, failover servers, management and network operations consoles, and the like are not shown so as to not obscure the details of the system architecture.

Each user of the social networking system 106 is associated with a user profile, which is stored in the user profile store 305. A user profile includes declarative information about the user that was explicitly shared by the user and may also include profile information inferred by the social networking system 106. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 305 may also maintain references to actions by the corresponding user performed on content items in the content store 310 and stored in the action log 320.

Each user of the social networking system 130 is associated with a user identifier that is unique to the user and associated with its user profile. Further, an ad history is associated with each user profile in the user profile store 305. As described above in conjunction with FIG. 1, the ad history identifies advertisements, or other content, presented to a user via one or more client devices 104A, 104B. For example, an ad history includes one or more of: a content ID for advertisements or other content provided to client devices 104A, 104B, a time stamp associated with each advertisement or content item provided to a client devices 104A, 104B for presentation to the user, a type of advertisement or content item presented to the user (e.g., selected, placebo, placeholder, or none), or some combination thereof. Associating content presented to a user with the user's user profile allows the social networking system 130 to maintain a record of the content presented to the user, even when the content is presented using client devices 104A, 104B that do not support cookies or other conventional tracking, such as mobile devices.

While user profiles in the user profile store 305 are frequently associated with individuals, allowing individuals to interact with each other via the social networking system 106, user profiles may also be stored for entities such as businesses or organizations. This allows an entity to establish a presence on the social networking system 106 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 310 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 310, such as status updates, photos tagged by users to be associated with other objects in the social networking system, events, groups or applications. In some embodiments, objects are received from third-party applications or third-party applications separate from the social networking system 106. In one embodiment, objects in the content store 310 represent single pieces of content, or content "items." Hence, social networking system users are encouraged to communicate with each other by posting text and content items of various types of media to the social networking system 106 through various communication channels. This increases the amount of interaction of users with each other and increases the frequency with which users interact within the social networking system 106.

The action logger 315 receives communications about user actions internal to and/or external to the social networking system 106, populating the action log 320 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 320.

The action log 320 may be used by the social networking system 106 to track user actions on the social networking system 106, as well as actions on third party systems 108 that communicate information to the social networking system 106. Users may interact with various objects on the social networking system 106, and information describing these interactions is stored in the action log 320. Examples of interactions with objects include: commenting on posts, sharing links, and checking-in to physical locations via a mobile device, accessing content items, and any other suitable interactions. Additional examples of interactions with objects on the social networking system 106 that are included in the action log 320 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 320 may record a user's interactions with advertisements on the social networking system 106 as well as with other applications operating on the social networking system 106. In some embodiments, data from the action log 320 is used to infer interests or preferences of a user, augmenting the interests included in the user's user profile and allowing a more complete understanding of user preferences.

The action log 320 may also store user actions taken on a third party system 108, such as an external website, and communicated to the social networking system 106. For example, an e-commerce website may recognize a user of a social networking system 106 through a social plug-in enabling the e-commerce website to identify the user of the social networking system 106. Because users of the social networking system 106 are uniquely identifiable, e-commerce websites, such as in the preceding example, may communicate information about a user's actions outside of the social networking system 106 to the social networking system 106 for association with the user. Hence, the action log 320 may record information about actions users perform on a third party system 108, including webpage viewing histories, advertisements that were engaged, purchases made, and other patterns from shopping and buying.

In one embodiment, the edge store 325 stores information describing connections between users and other objects on the social networking system 106 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 106, such as expressing interest in a page on the social networking system 106, sharing a link with other users of the social networking system, and commenting on posts made by other users of the social networking system 106.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 106, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 325 also stores information about edges, such as affinity scores for objects, interests, and other users. Affinity scores, or "affinities," may be computed by the social networking system 106 over time to approximate a user's interest in an object or another user in the social networking system 106 based on the actions performed by the user. A user's affinity may be computed by the social networking system 106 over time to approximate a user's affinity for an object, interest, and other users in the social networking system 106 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 325, in one embodiment. Alternatively, each interaction between a user and a specific object is stored as a separate edge. In some embodiments, connections between users may be stored in the user profile store 305, or the user profile store 305 may access the edge store 325 to determine connections between users.

One or more advertisement requests ("ad requests") are stored in the advertisement store 330. As described above in conjunction with FIG. 1, an advertisement request includes an advertisement and a bid amount. The advertisement includes content such as text, image, audio, video, or any other suitable data presented to a user. In various embodiments, the advertisement may also identify a network address of a landing page to which a user is directed when the advertisement is accessed. An advertiser associates a bid amount with an advertisement and indicates an amount the advertiser is willing to pay the social networking system 106 for presenting the advertisement to a user. The social networking system 106 may be used to determine an expected value to the social networking system 106 of the advertisement. For example, the expected value indicates an amount of monetary compensation the social networking system 106 receives from an advertiser if the advertisement is presented to a user, if a user interacts with the presented advertisement, or based on any other suitable condition. The expected value may account for the likelihood of a user accessing an advertisement. For example, the expected value is the product of the bid amount multiplied by a probability of the advertisement being accessed. Alternatively, the expected value may be the bid amount itself. When an advertisement is selected from the candidate ad request, the auction module 335 provides the selected advertisement to the web server 365 for communication to a client device 104A, 104B; additionally, the auction module 335 stores the content ID associated with the selected advertisement in the ad history associated with the user.

An advertisement request may also include one or more targeting criteria specified by the advertiser and identifying one or more characteristics of users eligible to be presented with the advertisement in the advertisement request. For example, targeting criteria act as a filter to identify users having information in a user profile, edges, or actions satisfying at least one of the targeting criteria. Hence, targeting criteria allow an advertiser to identify users having specific characteristics, simplifying subsequent distribution of content to groups of users.

In one embodiment, the targeting criteria specify actions performed by a user or types of connections between a user and another user or object of the social networking system 106. Actions specified by targeting criteria may be interactions performed by a user external to the social networking system 106, such as on a third party system 108. For example, targeting criteria identifies users that have taken a particular action, such as sending a message to another user, using an application, joining a group, or purchasing a product or service. As another example, targeting criteria may identify users having a connection to another user or object or having a particular type of connection to another user or object. Including actions or connections in targeting criteria allows advertisers to further refine users eligible to be presented with content from an advertisement request.

The auction module 335 selects advertisements from the advertisement store 330 for presentation to a user via a client device 104A, 104B or other device. In one embodiment, the auction module 335 identifies candidate advertisement requests from the advertisement store 330 for presentation to a user. Alternatively, the auction module 335 receives requests for advertisements including a user identifier and identifies candidate ad requests from the advertisement store 330 including targeting criteria identifying one or more characteristics satisfied by the user. Based on bid amounts included in the candidate ad requests, the auction module 335 ranks the candidate ad requests and uses the ranking to select an ad request including an advertisement for presentation to a user. In various embodiments, the auction module 335 selects an ad request including an advertisement for presentation using an internal auction, an external auction, or both. For example, the auction module 335 determines expected values for the candidate ad requests based on their bid amounts and likelihood of the identified user accessing advertisements in the candidate ad requests. Based on the expected values, the auction module 335 ranks the candidate ad requests and selects an ad request including an advertisement for presentation using the ranking.

In some embodiments, the auction module 340 selects an advertisement for presentation based at least in part on other information about the user stored on the social networking system 106. For example, information stored in a user's user profile, such as the user's ad history, identifies advertisers from which the user has previously viewed content. Additional information associated with a user by the social networking system 106 may also be used to select advertisements. For example, connections between the user and an advertiser may be retrieved from the edge store 325 and used as a factor in selecting advertisements. Hence, the auction module 335 may retrieve information about a user to be presented with an advertisement from the user profile store 205, the action log 320, the content store 310, the advertisement store 330, or another component to identify content previously viewed by the user. An example process for targeting advertisements to users via in mobile applications is disclosed in U.S. patent application Ser. No. 13/689,160, filed on Nov. 29, 2012, which is hereby incorporated by reference in its entirety.

The ad credit module 340 determines whether to credit a conversion event to presentation of an advertisement (an "impression" of the advertisement). As described above, an impression of an advertisement occurs when the advertisement is presented to a user, regardless of whether the user accesses the advertisement. When a conversion event associated with an advertisement occurs on a client device 104A, 104B, the ad credit module 340 receives user ID information, a content ID, and a time of the conversion event from the client device 104A, 104B via the web server 365 and retrieves an ad history associated with the received user ID information. To determine whether to credit an impression of an advertisement to a conversion event, the ad credit module 340 compares the received content ID with content IDs stored in the retrieved ad history. If the content ID matches a content ID of an advertisement stored in the ad history, the ad credit module 340 credits the conversion event to the advertisement if a time between the conversion event and providing the advertisement to the client device 104A is less than a threshold time period. If the received content ID does not match a content ID included in the retrieved ad history or if the time between conversion event and providing an advertisement identified by the ad history to a client device 104A, 104B is greater than the threshold time period, the conversion event is not credited to the impression.

In some embodiments, the ad credit module 106 may adjust the threshold time period used in determining whether to credit the conversion event to an impression, based on group statistics stored in the group data store 350. Additionally, in some embodiment, the ad credit module 106 may determine the threshold time period is determined by analyzing portions of the group statistics over a particular length of time (timing window).

The group classifier 345 associates a social networking system user with a holdout group or a target group for an advertisement. For example, the group classifier 345 uses one or more polling algorithms to associate users with a target group that is eligible to receive an advertisement or to associate users with a holdout group that is not presented with the advertisement. A polling algorithm associates a specified percentage of users to the holdout group for the advertisement so that a number of users are not presented with the advertisement while users not in the holdout group may be presented with the advertisement. As described, above, different polling algorithms may be used for different advertisements so holdout groups associated with different advertisements include different amounts of users. Thus a user may be associated with different groups for different advertisements.

In one embodiment, a group ID is associated with a holdout group for an advertisement and a different group ID is associated with a target group for the advertisement. The group classifier 345 may store user ID information associated with a group ID and a content ID for the target group and with a group ID for the holdout group to identify users in the target group or in the holdout group for an advertisement corresponding to the content ID. However, in other embodiments, the group classifier 345 stores any suitable information to identify users in a holdout group or in a target group for various advertisements.

The group data store 350 maintains group statistics describing conversion events and other actions performed by users in a holdout group or in a target group for various advertisements. Group statistics may be organized by group IDs or by a combination of group IDs and content IDs. In various embodiments, group statistics may include user ID information for users in target groups for various advertisements, user ID information for users in holdout groups for various advertisements, type of conversion event, time between impression and conversion event, a time for a conversion event, an identifier for the client device which the impression occurred, an identifier for the client device used for the conversion event, adjustment value, an adjusted fee, currency information, a conversion value, some other suitable information, or some combination thereof. Reports may be generated using the stored group statistics. For example, a report may identify the number of conversion events performed by users in a target group for an advertisement that were presented with the advertisements and a number of conversion events performed by users in a holdout group for the advertisement. This may be used to provide an advertiser with information about the number of conversion events occurring organically against the number of conversion events occurring when users are presented with an advertisement, providing insight into the effectiveness of an advertisement. In some embodiments, the group statistics in the group data store 340 are updated as conversion events occur.

The fee module 355 determines an initial fee to charge an advertiser and determines an adjustment value for modifying the initial fee based on the group statistics. The initial fee is determined from the bid amounts of the ad requests from which an advertisement was selected. For example, the initial fee is the bid amount of a selected advertisement or is the bid amount of an ad request having a bid amount lower than the bid amount of the selected advertisement incremented by an amount. The fee module 355 determines a holdout conversion rate and a target conversion rate from the group statistics and determines an adjustment value based on the target conversion rate and the holdout conversion rate. The holdout conversion rate is the ratio of the number of users in the holdout group performing a conversion event to a total number of users in the holdout group. Similarly, the target conversion rate is the ratio of the number of users in the target group performing a conversion event to a total number of users in the target group.

In one embodiment, the adjustment value is the difference between the target conversion rate and the holdout conversion rate. Based on the adjustment value, the fee module 355 adjusts the initial fee. Any suitable process may be used to adjust the initial fee. For example, the fee module 355 multiplies the initial fee by one minus the adjustment value to determine an adjusted fee and charges the advertiser the adjusted fee. As another example, the initial fee is adjusted by a set percentage depending on a range including the adjustment value.

In one embodiment, the social networking system 106 includes the predictor module 360, which analyzes the group statistics to determine advertisement pricing. The predictor module 360 may use portions of the group statistics as training samples to learn pricing schemes for use in selecting an advertisement from ad requests. Examples of portions of group statistics used by the predictor module 360 include percentages of conversions for users in the holdout group and in the target group, adjustment values for advertisements, fees charged for advertisements, or any other suitable information. The predictor module 360 adjust bid amounts of ad request based on its analysis of group statistics to more accurately determine bid prices for advertisements and select an advertisement from ad requests.

The web server 365 links the social networking system 106 via the network 220 to the one or more of the client devices 104A-B, as well as to the one or more third party systems 108. The web server 365 serves web pages, as well as other web-related content, such as JAVA®, FLASH®, XML and so forth. The web server 365 may receive and route messages between the social networking system 106 and the client devices 104A, 104B, for example, instant messages, queued messages (e.g., email), text messages, short message service (SMS) messages, or messages sent using any other suitable messaging technique. A user may send a request to the web server 365 to upload information (e.g., images or videos) that are stored in the content store 310. Additionally, the web server 365 may provide application programming interface (API) functionality to send data directly to native client device operating systems, such as IOS®, ANDROID™, WEBOS® or RIMO.

Monitoring and Fee Determination for Onsite and Offsite Conversion Events

Figure 4A:
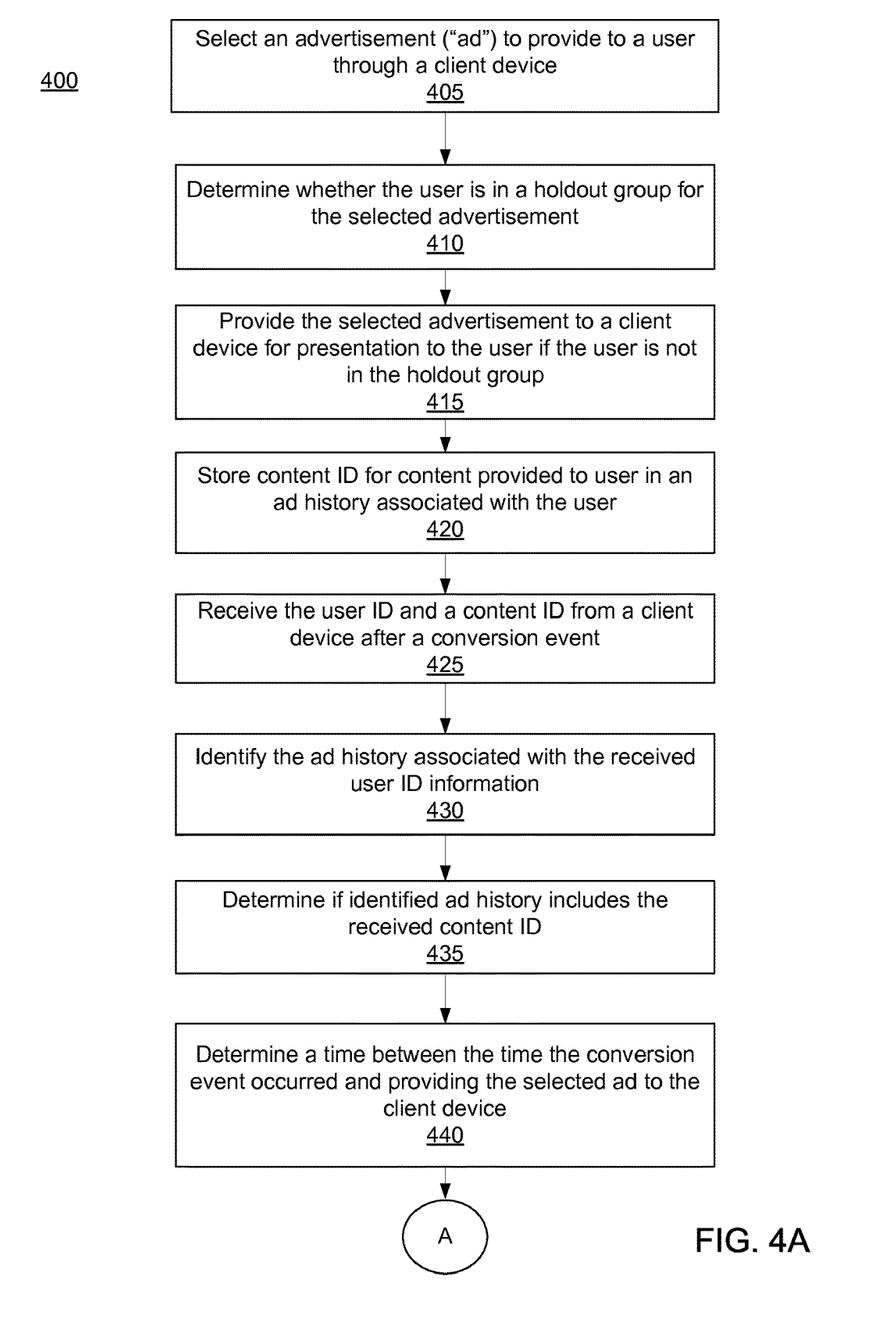
FIGS. 4A and 4B are a flowchart of a process for monitoring conversion events and determining fees to charge advertisers for conversion events, in accordance with an embodiment of the invention.
Figure 4B:
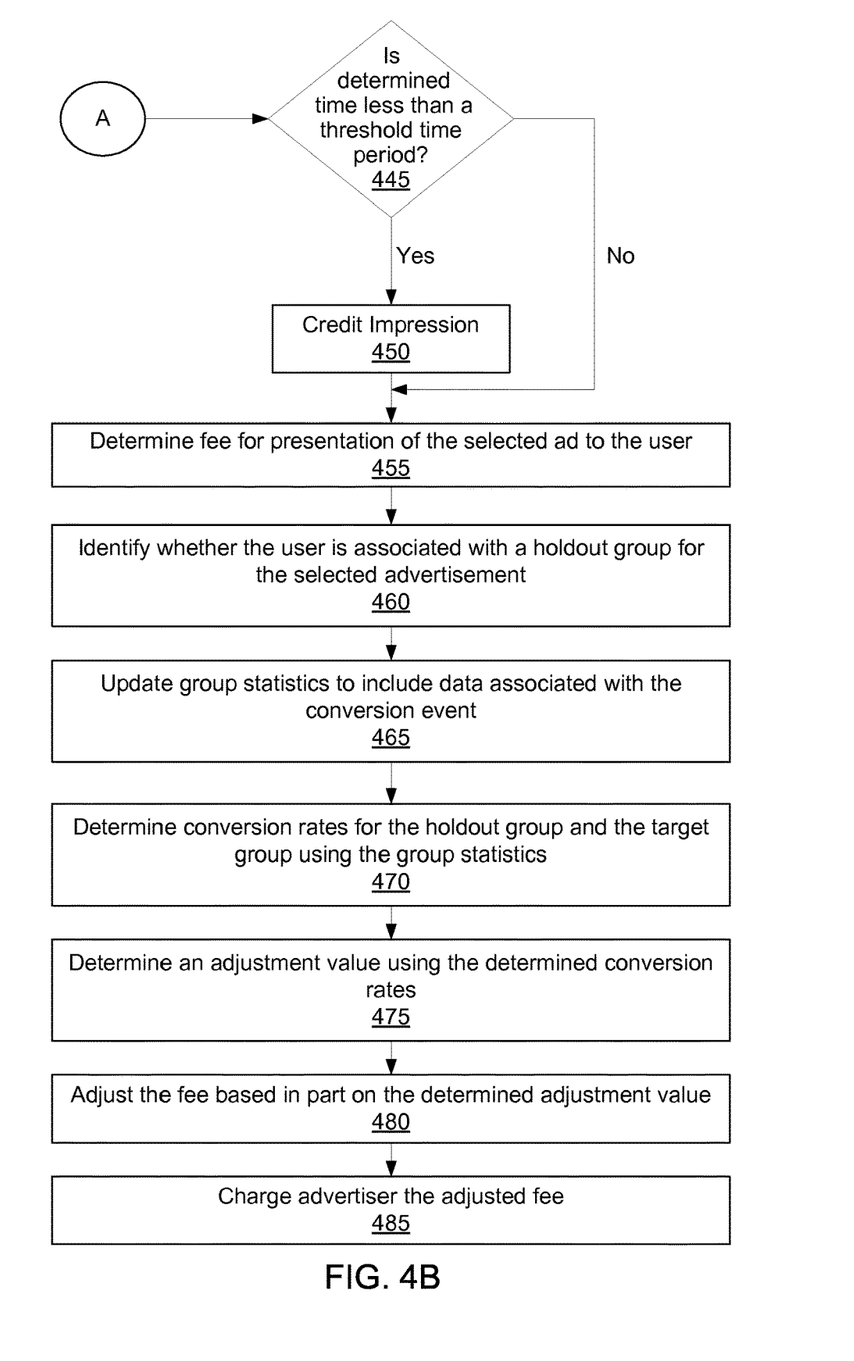

FIGS. 4A and 4B are a flow chart of one embodiment of a process 400 for monitoring conversion events and determining fees to charge advertisers for those conversion events. The social networking system 106 receives one or more candidate ad requests from one or more third party systems 108 or locally generates candidate ad requests. From the candidate ad requests, the social networking system 106 selects 405 an advertisement ("ad") to provide to a user via a client device 104A. As described above, the advertisement may be selected 405 based on bid amounts of the candidate ad requests, and may account for targeting criteria associated with the candidate ad requests.

The social networking system 106 determines 410 whether the user to be presented with the selected advertisement is in a holdout group for the selected advertisement. As described above, a holdout group identifies social networking system users that are withheld from being presented with the advertisement; users not in the holdout group are considered to be associated with a target group for the advertisement that is eligible to be presented with the advertisement. If the user is not associated with the holdout group for the selected advertisement, the social networking system 106 provides 415 the selected ad to the client device 104A for presentation to the user; however, if the user is associated with the holdout group for the selected advertisement, content other than the selected advertisement is provided 415 to the client device 104A for presentation to the user. For example, a placeholder, a placebo advertisement, or no content is provided 415 to the client device 104A if the user is associated with the holdout group for the selected advertisement.

The social networking system 106 stores 420 a content ID associated with the content provided 415 to the client device 104A, such as a content ID associated with the selected advertisement if it is provided to the client device 104A. Additionally, the social networking system 106 also stores a time stamp associated with each advertisement or other content provided 415 to the client device in the ad history. As described above in conjunction with FIG. 3, the ad history of a user is associated with user ID information used by the social networking system to uniquely identify the user.

When the user performs a conversion event using the client device 104A on which the content was presented or on a different client device 104B, the social networking system 106 receives 425 the user ID information and a content ID from the client device 104A, 104B after the conversion event. In some embodiments, the social networking system 106 may receive a conversion value, currency information, some other suitable information, or some combination thereof, from the client device 104A, 104B. In addition to the content ID and the user ID information, the social networking system 106 may also receive a timestamp indicating when the conversion event occurred. For example, the received content ID specifies content associated with the conversion event. As another example, the received content ID identifies content presented to the user within a threshold time interval before the conversion event. As described above in conjunction with FIG. 1, the user ID information and the content ID may be received 425 from the client device 104A on which the selected advertisement or other content was presented 425 or may be received from a different client device 104B than the client device 104A that presented the selected advertisement or other content.

From the received user ID information, the social networking system 106 identifies 430 the ad history associated with the user. If the user ID information identifies multiple social networking system users, ad histories for each of the identified users are identified 430. For example, a user profile associated with the received user ID information is identified and the ad history is retrieved from the identified user profile.

The social networking system 106 determines 435 if the identified ad history includes the received content ID. For example, the social networking system 106 determines 435 if the received content ID matches a content ID for the selected advertisement included in the identified ad history.

This determines 435 if the user was presented with the selected advertisement prior to the conversion event occurring.

If the content ID matches the content ID for the selected advertisement in the identified ad history, the social networking system 106 determines 440 a time between the time of the conversion event and the time when the selected advertisement was provided to the client device 104A. For example, the social networking system 106 determines 440 a difference between a time stamp associated with the received content ID and a time stamp stored in the ad history associated with the content ID stored in the ad history associated with the selected advertisement and matching the received content ID.

The social networking system 106 determines 445 whether the time between the conversion event and providing the selected advertisement to the client device 104A is less than a threshold time period. If the time is less than the threshold time period, the social networking system 106 credits 450 the conversion event to presentation of the selected advertisement (i.e., credits 450 the conversion event to an impression of the selected advertisement). For example, the social networking system 106 may credit conversion events to impressions of the selected advertisement occurring 30 days or less prior to the conversion event. If the determined time is greater than the threshold time period, the conversion event is not credited to presentation of the selected advertisement. Comparing the content ID received when a conversion event occurs to content IDs in an ad history maintained for the user allows the social networking system 106 to track and a credit conversions to presentation of an advertisement even when the conversion event occurs on a client device 104B other than the client device 104A on which the selected advertisement was presented. While the preceding example credits a conversion event to presentation of the selected advertisement, other information about the timing of the conversion event and the presentation of the selected event may be used. Additionally, in some embodiments the conversion event may be credited to presentation of the selected advertisement if the content ID matches the content ID for the selected advertisement in the identified ad history without determining timing information for the conversion event and for presentation of the selected advertisement.

After determining whether to credit the conversion event to presentation of the selected advertisement, the social networking system 106 determines 455 a fee for presentation of the selected ad to the user. If the conversion event was credited 450 to an impression of the selected advertisement, the fee is determined 455 from the bid amounts of the ad requests from which the selected advertisement was selected. For example, the fee is the bid amount of the ad request including the selected advertisement or the fee is the bid amount of the ad request having the next highest bid amount to the ad request including the selected advertisement incremented by a value. If the conversion event was not credited to an impression of the selected advertisement, the initial fee is zero.

The social networking system 106 identifies 460 whether the user is associated with a holdout group for the selected advertisement. For example, the social networking system 106 compares the user ID information for the user to stored user ID information associated with a holdout group for the selected advertisement. If the user ID information is not included in the stored user ID information associated with the holdout group, the social networking system 106 identifies 460 the user as included in a target group eligible to be presented with the selected advertisement. If the user ID information is included in the stored user ID information for the holdout group, the social networking system 106 identifies 406 the user as associated with the holdout group for the selected advertisement. The social networking system 106 updates 465 the group statistics for the corresponding group including the user to include data associated with the conversion event.

Using group statistics for the holdout group and the target group for the selected advertisement, the social networking system determines 470 conversion rates for the holdout group and the target group. For example, the holdout conversion rate is based on a number of conversion events associated with the selected advertisement performed by users associated with the holdout group. Similarly, the target conversion rate is based on a number of conversion events associated with the selected advertisement performed by users associated with the target group.

Based on the holdout conversion rate and the target conversion rate, the social networking system determines 475 an adjustment value for the fee. In one embodiment, the adjustment value is the difference between the percentage of users in the target group performing a conversion event and the percentage of users in the holdout group performing a conversion event. The social networking system 106 adjusts 480 the fee based in part on the determined adjustment value. For example, the social networking system 106 multiplies the initial fee by one minus the adjustment value to determine an adjusted fee. If the initial fee is zero (e.g., impression was not credited for the conversion event), the adjusted fee is also zero. The social networking system 106 then charges 485 the advertiser the adjusted fee. In some embodiments, the social networking system 106 may update the group statistics to identify the adjustment value, the adjusted fee, or both.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   accessing, by an online system, an ad history associated with a user identifier of a user of the online system, the ad history identifying advertisements presented to the user;
   selecting an ad for presentation to a client device of the user;
   transmitting the selected ad for display from the online system to the client device;
   storing, by the online system, a content identifier (ID) associated with the selected ad and a time stamp when the selected ad was transmitted to the client device in the ad history associated with the user identifier of the user;
   receiving, by the online system, the user identifier of the user, a content ID after a conversion event has occurred using a different device associated with the user, and a time of the conversion event from the different device associated with the user;
   retrieving, by the online system, the ad history associated with the received user identifier;
   matching, by the online system, the received content ID with the content ID associated with the selected ad stored in the ad history;
   determining, by the online system, that the ad caused the conversion event based at least in part on whether a difference between the time of the conversion event received from the different device associated with the user and the time stamp when the selected ad was transmitted to the client device is less than a threshold time period for conversion of the ad; and
   determining, by the online system, a fee for presentation of the selected ad to the user in response to the determination that the ad caused the conversion event.

2. The method of claim 1, wherein the conversion event is an action associated with the selected advertisement by an advertiser.

3. The method of claim 1, wherein receiving, by the online system,
   the user identifier of the user and the content ID after the conversion event has occurred using the different client device associated with the user comprises:
   receiving the user identifier stored by the different client device and associated with the online system identified by execution of instructions by the different client device.

4. The method of claim 1, wherein the content ID from the different client device identifies content associated with the conversion event.

5. The method of claim 1, further comprising:
   receiving an additional user identifier for an additional user of the online system.

6. The method of claim 5, further comprising:
   retrieving a second ad history associated with the additional user; and
   comparing the received content ID with content IDs stored in the ad history and in the second ad history.

7. The method of claim 5, wherein retrieving, by the online system,
   the ad history associated with the received user identifier comprises:
   retrieving an ad history associated with a user of the client device that most recently accessed the online system.

8. A method comprising:
   selecting an ad for presentation to a client device of a user of an online system;
   transmitting the selected ad for display from the online system to the client device;
   storing, by the online system, a content identifier (ID) associated with the selected ad and a time stamp when the selected ad was transmitted to the client device in an ad history associated with the user identifier of the user, the ad history identifying advertisements presented to the user;
   receiving, by the online system, the user identifier of the user, a content ID after a conversion event has occurred using a different client device associated with the user, and a time of the conversion event from the different device associated with the user;
   retrieving, by the online system, the ad history associated with the user identifier of the user;
   matching, by the online system, the received content ID with the content ID associated with the selected ad stored in the ad history;
   determining, by the online system, that the ad caused the conversion event based at least in part on whether difference between the time of the conversion event received from the different device associated with the user and the time stamp when the selected ad was transmitted to the client device is less than a threshold time period for conversion of the ad; and
   determining, by the online system, a fee for presentation of the selected ad to the user in response to the determination that the ad caused the conversion event.

9. The method of claim 8, wherein the conversion event comprises an action associated with the selected advertisement by an advertiser.

10. The method of claim 8, wherein receiving, by the online system, the user identifier of the user and a content ID after a conversion event has occurred using the different client device associated with the user comprises:

receiving the user identifier stored by the different client device and associated with the online system identified by execution of instructions by the different client device.

11. The method of claim 8, wherein the content ID from the client device identifies content associated with the conversion event.

12. The method of claim 8, further comprising:
receiving an additional user identifier associated with an additional user of the online system.

13. The method of claim 12, further comprising:
retrieving a second ad history associated with the additional user; and
comparing the received content ID with content IDs stored in the ad history and in the second ad history.

14. The method of claim 12, wherein retrieving, by the online system,
the ad history associated with the user identifier comprises:
retrieving an ad history associated with a user of the client device that most recently accessed the online system.

15. A method comprising:
accessing, by an online system, an ad history associated with a user identifier of a user of the online system, the ad history identifying advertisements presented to the user;
selecting an ad for presentation to a client of the user;
transmitting the selected ad from the online system to the client device for presentation to the user;
storing, by the online system, a content identifier (ID) associated with the selected ad and a time stamp when the selected ad was transmitted to the client device in the ad history associated with the user identifier of the user;
receiving, by the online system, the user identifier of the user, a content ID after a conversion event has occurred using a different client device associated with the user, and a time of the conversion event from the different device associated with the user, the conversion event comprising an action associated with the selected advertisement by an advertiser;
retrieving, by the online system, the ad history associated with the user identifier of the user;
determining, by the online system, a fee for presentation of the selected ad to the user in response to the received content ID from the different client device matches the content ID associated with the selected ad stored in the ad history associated with the user identifier of the user and based on whether a difference between the time of the conversion event received from the difference device associated with the user and the time stamp when the selected ad was transmitted to the client device is less than a threshold time period for conversion of the selected ad; and
storing information associating the conversion event with presentation of the selected ad if the received content ID from the different client device matches the content ID associated with the selected ad stored in the ad history associated with the user ID of the user and the time between the conversion event and the providing of the selected ad to the client device is less than the threshold time period.

16. The method of claim 15, wherein receiving the user identifier of the user and the content ID after the conversion event has occurred using the different client device associated with the user comprises:
receiving the user identifier stored by the different client device and associated with the online system identified by execution of instructions by the different client device.

17. The method of claim 15, wherein determining, by the online system, a fee for presentation of the selected ad to the user if the received content ID from the different client device matches the content ID associated with the selected ad stored in the ad history associated with the user identifier of the user and based on whether the time between the conversion event and the providing of the selected ad to the client device is less than the threshold time period comprises:
determining if a time between the conversion event and providing the selected ad to the client device is less than a threshold time period; and
determining the fee for presentation of the selected ad to the user if the time between the conversion event and providing the selected ad to the client device is less than the threshold time period.

18. The method of claim 15, wherein the content ID from the different client device identifies content associated with the conversion event.

19. The method of claim 15, further comprising:
receiving an additional user identifier associated with an additional user of the online system.

20. The method of claim 19, further comprising:
retrieving a second ad history associated with the additional user; and
comparing the received content ID with content IDs stored in the ad history and in the second ad history.

21. The method of claim 19, wherein retrieving the ad history associated with the received user identifier comprises:
retrieving an ad history associated with a user of the client device that most recently accessed the online system.

22. The method of claim 1, wherein the online system is a social networking system.

* * * * *

UNITED STATES PATENT AND TRADEMARK OFFICE
CERTIFICATE OF CORRECTION

PATENT NO. : 10,354,287 B2  
APPLICATION NO. : 13/909312  
DATED : July 16, 2019  
INVENTOR(S) : Richard Bill Sim et al.

Page 1 of 1

It is certified that error appears in the above-identified patent and that said Letters Patent is hereby corrected as shown below:

On the Title Page

(72) Inventors: after "Sadik Gokhan" delete "Coglar" and insert -- Caglar --.

Signed and Sealed this  
Twenty-first Day of January, 2020

Andrei Iancu  
*Director of the United States Patent and Trademark Office*